Sept. 15, 1931. H. E. NEHIN 1,823,660
ROTARY LIFTING JACK AND WHEEL
Filed Oct. 13, 1928
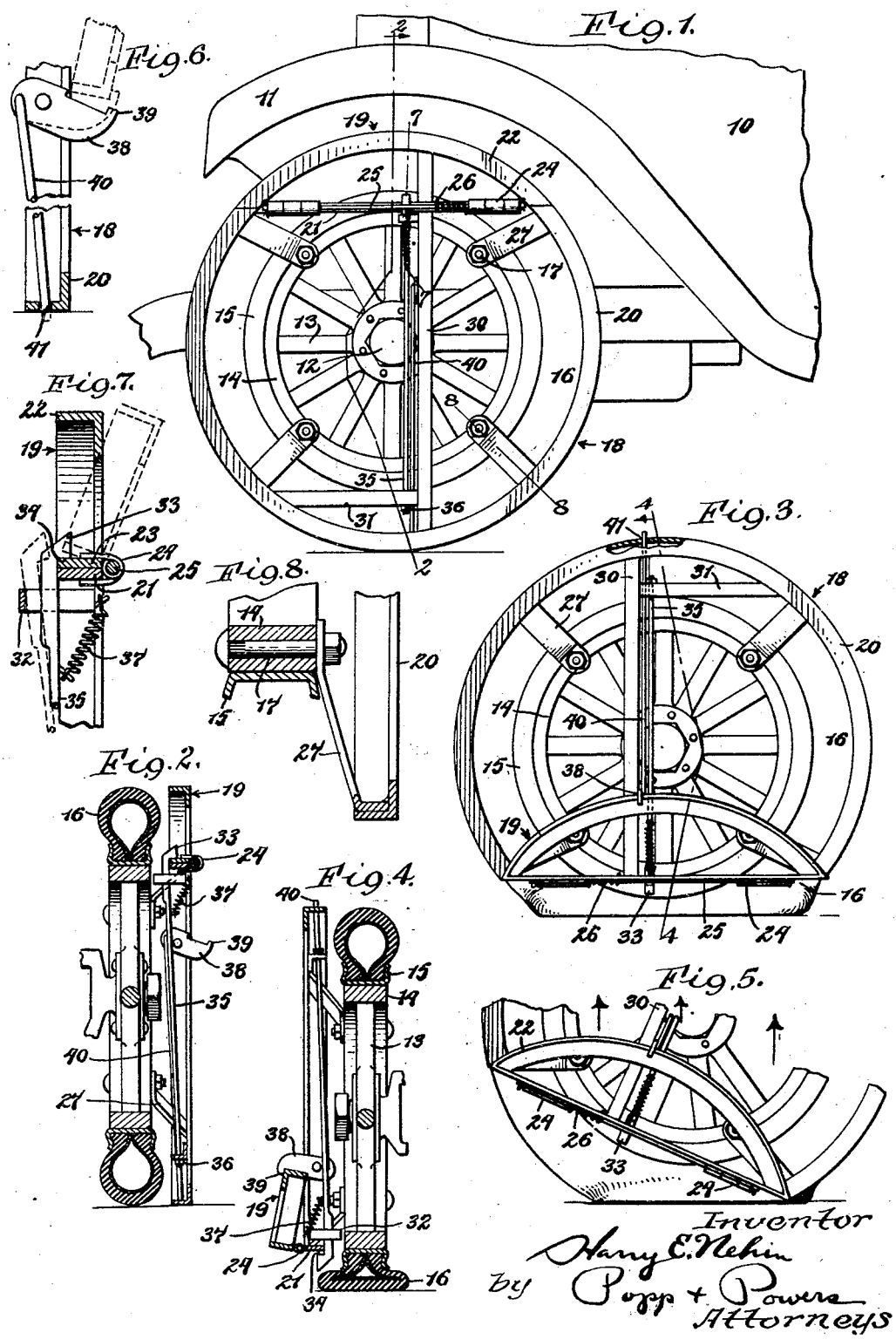

Patented Sept. 15, 1931

1,823,660

UNITED STATES PATENT OFFICE

HARRY E. NEHIN, OF BUFFALO, NEW YORK, ASSIGNOR OF ONE-HALF TO EARLE WESTBROOK, OF WACO, TEXAS

ROTARY LIFTING JACK AND WHEEL

Application filed October 13, 1928. Serial No. 312,271.

This invention relates to a rotary lifting jack and wheel for vehicles and more particularly to such a rotary jack and wheel which is intended to be attached to the wheel of an automobile when a tire is punctured and thereby to enable the car to be driven to a garage without injury to the tire and without the necessity of making a road change or repair of the tire which is very often extremely inconvenient, particularly with the limited variety of tools that an autoist generally has at his disposal.

The principal object of this invention is to provide such a rotary lifting jack and wheel which can be quickly and easily applied to the wheel without the use of a jack to elevate the wheel and vehicle in order to permit of applying the same.

Another object of this invention is to provide such a rotary lifting jack and wheel which is applied in a collapsed condition and which automatically distends itself into circular form upon horizontal movement of the vehicle. By this means it is only necessary for the driver to attach the device in a collapsed condition and then drive away on the same, the elevation of the car on to the device and the distending of the device to operative form being entirely automatic.

A further object is to provide such a rotary lifting jack and wheel which reliably holds its distended form so as to ensure safe driving on the same, and also to provide such a wheel in which there is no danger of pinching or otherwise injuring the tire shoe carried by the wheel which the auxiliary rim supplants.

Other aims are to provide such a rotary lifting jack and wheel which is compact and can be readily stored in the space available under the seats or in the trunk of an automobile, which is simple and inexpensive in construction, and contains few parts, these parts being so designed that they are not liable to get out of order with frequent use.

In the accompanying drawings:—

Figure 1 is a side elevation of a portion of an automobile showing the rotary lifting jack and wheel attached to the standard wheel thereof, the jack being in a position in which the same is available for use as a rolling support for the vehicle.

Figure 2 is a vertical section taken on line 2—2 of Fig. 1.

Fig. 3 is a side elevation of the rotary lifting jack and wheel attached to an automobile wheel and similar to Fig. 1 but showing the auxiliary wheel in a collapsed condition, in which condition the same is attached to the standard wheel.

Figure 4 is a vertical section taken on line 4—4 of Fig. 3.

Figure 5 is a fragmentary view similar to Fig. 3 showing the vehicle about to ride up on one of the segments of the rotary jack.

Figure 6 is a fragmentary vertical section showing the latch for holding the rotary jack in its collapsed condition.

Figure 7 is a radial section taken on line 7—7 Fig. 1, and showing the latch for holding the rotary jack and wheel in its operative or distended position.

Figure 8 is a radial section taken on line 8—8 Fig. 1, and showing the means for attaching the rotary jack to the standard wheel.

Similar characters of reference indicate like parts in each of the figures of the drawings.

In its general organization this invention comprises a rotary lifting jack and wheel which is composed of two segments of unequal sizes, the smaller segment being pivoted to swing laterally relative to the larger section and being adapted to be locked in an operative position in circular relation to the larger segment or in an inoperative position against the face of the larger segment. Means are provided for attaching the larger segment to the rim of a vehicle wheel and this larger segment is so porportioned that upon forward or rearward movement of the vehicle, the vehicle rides upon the larger segment, thereby jacking up or elevating the vehicle. After the vehicle is supported by the larger segment, means are provided which contact with the road and automatically move the smaller segment into operative or circular relation to the larger segment and permit the rotary jack to be used as an auxiliary wheel without further attention on the part of the driver.

The automobile shown in the drawings has the usual body 10, fender 11, and wheel which is composed of a hub 12, spokes 13, felly 14, and demountable rim 15 which carries the shoe 16 of the tire. The felley 14 is provided with the usual carriage bolts 17, these bolts extending through the felly and being normally used in securing the lugs (not shown) which prevent lateral displacement of the demountable rim.

The rotary jack and wheel embodying the present invention includes a larger segment 18 and a smaller segment 19. This rim 20 of the larger segment is preferably made of angle iron bent into annular form and the ends thereof are connected by a coss bar 21 which may be welded or otherwise secured in place. In a similar manner the smaller segment 19 is preferably composed of an angle iron rim 22 and a cross bar 23 between the ends of the rim. These segments are pivotally connected by hinges 24 which are secured to the cross bars 21 and 23 in any suitable manner and preferably have a common pintle or pivot pin 25.

These hinges are so arranged that the smaller segment 19 can either swing into its operative position in which it is in circular relation to the larger segment 18 and in which the sides of the cross bars 21 and 23 are arranged face to face, as shown in Fig. 7, or the smaller segment 19 can be swung outwardly and against the face of the larger segment 18, as shown in Figs. 3, 4 and 5. The smaller segment is normally held in its operative or circular relation to the larger segment, as shown in Figs. 1 and 2, by means of a helical spring 26 which encircles the pintle or pivot pin 25 of the hinges and bears against opposite sides of the cross bars 21 and 23.

Any suitable means may be provided for attaching the larger segment 18 to the rim 14 of the standard vehicle wheel, the preferred means shown in the drawings comprising a plurality of metal arms 27, each of which is welded or otherwise secured to the inner side of the rim 20 and extends laterally and inwardly therefrom. At the inner ends of these arms 27 openings are provided which are adapted to receive the carriage bolts 17 which normally are employed in holding the lugs (not shown) against the demountable rim 15. These arms are so arranged that the openings therein register with the bolts, and the arms are so designed as to rest against the side of the demountable rim 15 and form a substitute for the usual lugs. By this means, in applying the rotary jack and wheel it is only necessary to remove the usual rim nuts and lugs, place the arms 27 of the larger segment 18 over the rim bolts and replace the rim nuts so as to secure the auxiliary wheel to the standard wheel.

The means for normally locking the smaller segment in operative relation to the larger segment so as to insure the safe use of the auxiliary wheel as a rolling support without danger of having the same collapse, particularly when a turn is made on the same, are preferably constructed as follows:—

The larger segment is provided with a cross bar 30 which is welded or otherwise suitably secured at its opposite ends to the cross bar 21 and to the rim 20 and is preferably of angle form in cross section. Adjacent to the periphery of the larger segment another cross bar 31 preferably of angle form in cross section is provided, this cross bar being secured at one end to the cross bar 30 and at its other end to the rim 20 and being arranged parallel with the cross bar 21. To the inner side of the cross bar 30 is secured a bracket 32 which guides a latch 33 and permits this latch to be moved laterally, as best shown in Fig. 7. This latch is of L-form and is provided with a shoulder 34 which is adapted to engage the outer face of the cross bar 23 of the smaller segment 19. Formed integrally with this latch 33 is a rod 35, which rod extends substantially radially of the wheel and is secured at its opposite end to the cross bar 31 by means of a nut 36. This latch 33 is normally held in the full line position shown in Fig. 7 by means of a helical spring 37 which is secured at one end to the larger segment in any suitable manner and at its other end to the latch 33. By this means when the smaller segment is released the spring 26 forces it to swing outwardly into its operative position shown by full lines in Fig. 7. In this movement the cross bar 23 of the smaller segment engages the latch 33 and moves it laterally until the cross bar 23 passes beyond the shoulder 34, at which time the latch, under the influence of the return spring 37, is moved back again and engages the face of the cross bar 23 and holds the smaller segment against movement relative to the larger segment. When, however, it is desired to release the smaller segment, the latch 33 is manually moved to the dotted line position shown in Fig. 7 and the smaller segment can then be swung outwardly against the resistance of the spring 26.

Means are provided for locking the smaller segment against the face of the larger segment or in its inoperative position, which means are releasable by contact with the road and are preferably constructed as follows:—

The numeral 38 represents a latch which is pivoted at its center to the side of the cross bar 30 of the larger segment and at its outer end is provided with a finger 39 which is adapted to engage the rim 22 of the smaller segment 19 when the smaller segment is swung against the face of the larger segment. To the other end of this latch 38 is pivoted a rod 40, which rod extends through a guide opening provided in the cross bar 31 and also through an opening 41 provided in the rim 20 of the larger segment. As best shown in Fig. 3, the end of this rod projects a substantial distance beyond the periphery of the rim 20. It is apparent that upon engagement of the outer end of the rod 40 this rod will be moved longitudinally and swing the latch 38 about its pivotal axis so as to release the rim 19 of the smaller segment and permit the smaller segment to assume its operative position under the influence of the spring 26. In applying and operating this rotary jack and wheel, the operation is as follows:—

Assuming the auxiliary jack and wheel to be in its distended condition, the person applying the jack and wheel first presses the latch 33 laterally into its dotted line position shown in Fig. 7 so as to release the cross bar 23 of the smaller segment 19. He then swings the smaller segment laterally outward against the resistance of the spring 26 and against the face of the larger segment 18. The latch 38 is then moved so that its finger 39 engages the edge of the rim 22 of the smaller segment and holds it against the face of the larger segment without further attention on the part of the person applying the device.

The larger segment 18 is then attached to the felly 14 of the automobile wheel. This is possible without jacking the car, since although the jack and wheel are of larger diameter than both the automobile rim and the inflated tire, the smaller segment being held in its inoperative position against the face of the larger segment decreases the effective diameter on that side of the wheel and permits the larger segment to be readily applied, as shown in Fig. 3. The larger segment is attached, as described, by removing the usual lugs which support the demountable rim on the felly and placing the openings in the arms 27 over these bolts and securing these arms against the sides of the felly and the rim by replacing the rim nuts on these bolts.

After the larger segment has been securely bolted in place the automobile is driven forwardly or backward. As soon as this occurs, as best shown in Fig. 5, the leading corner of the rim 20 of the larger segment engages the road and consequently the vehicle rides upon the larger segment and is thereby elevated relative to the surface of the road, and the tire in this elevated position is held out of contact with the road, or substantially so and with the auxiliary rim, as best shown in Fig. 2. The further movement of the vehicle brings the projecting end of the rod 40 into engagement with the road and as soon as this occurs this projecting end is moved inwardly, which movement of the rod 40 rocks the latch 38 so as to release the rim of the smaller segment 19. When this occurs the return spring 26 immediately forces the smaller segment outwardly and into engagement with the latch 33. This latch, as shown in Fig. 7, engages the face of the cross bar 23 of the smaller segment 29 and thereby holds the two cross bars 21 and 23 in engagement with each other and the smaller segment 19 in circular or operative relation to the larger segment 18. The two segments of the device are now in the form of a locked circular rim and the automobile can be driven to the point of destination or to a garage without further attention to the punctured tire or to the auxiliary wheel on the part of the driver.

Although the foregoing description represents the preferred embodiment of my invention, it is to be understood that various changes can be made in the details and still retain the essence of this invention as summed up in the appended claims.

As a whole this invention is comparatively inexpensive and simple considering the function which it performs. It can be readily attached to the automobile wheel carrying the disabled tire and after being so positioned automatically operates to both raise the car onto the auxiliary wheel and to move the parts of the rotary jack and wheel into their operative position. The vehicle is furthermore supported in such manner that there is no danger of injuring the disabled tire in the use of the rotary jack as a wheel.

I claim as my invention:—

1. A rotary jack and auxiliary wheel for vehicle wheels or the like, said auxiliary wheel being composed of two segments of unequal sizes, a pivotal connection between said segments permitting said smaller segment to swing laterally relative to said larger segment, means for securing said larger segment to the vehicle wheel whereby upon horizontal movement of said vehicle, said vehicle rides up on said larger segment and means for locking said smaller segment against the face of said larger segment.

2. A rotary jack and auxiliary wheel for vehicle wheels or the like, said auxiliary wheel being composed of two segments of unequal sizes, a pivotal connection between said segments permitting said smaller segment to swing laterally relative to said larger segment, means for securing said larger segment to one of the vehicle wheels whereby upon horizontal movement of said vehicle, said vehicle rides up on said larger segment, means for locking said smaller segment against the face of said larger segment, and means actuated by contact with the road for releasing said locking means.

3. A rotary jack and auxiliary wheel for vehicle wheels or the like, said auxiliary wheel being composed of two segments of unequal sizes, a pivotal connection between said segments permitting said smaller segment to swing laterally relative to said larger segment, means for securing said larger segment to one of the vehicle wheels whereby upon horizontal movement of said vehicle, said vehicle rides up on said larger segment, means for locking said smaller segment against the face of said larger segment including a latch, spring means yieldingly holding said latch in engagement with said smaller segment and means for releasing said smaller segment from said latch through contact with the surface of the road, comprising a member carried by said larger segment, one end of said member extending beyond the periphery of said larger segment and the other end being secured to said latch.

4. A rotary jack and auxiliary wheel for vehicle wheels or the like, said auxiliary wheel being composed of two segments of unequal sizes, a pivotal connection between said segments permitting said smaller segment to swing laterally relative to said larger segment, means for securing said larger segment to one of the vehicle wheels whereby upon horizontal movement of said vehicle, said vehicle rides up on said larger segment, means for locking said smaller segment against the face of said larger segment comprising a latch pivotally mounted on said larger segment, a rod carried by said larger segment and extending through the periphery of said larger segment, a spring cooperating to hold said latch in engagement with said smaller segment, said rod being longitudinally movable on contact with the road to release said latch from said smaller segment and permit said smaller segment to move to its operative position with reference to said larger segment.

5. A rotary jack and auxiliary wheel for vehicle wheels or the like, said auxiliary wheel being composed of two segments of unequal sizes, each of said segments being composed of segmental rims and a bar connecting the ends of each of said rims, hinges connecting the bars of each segment permitting the smaller segment to swing laterally relative to said larger segment, and means for releasably holding said smaller segment against the side of said larger segment comprising a latch pivotally mounted on said larger segment and engageable with the rim of said smaller segment and spring means holding said latch in engagement with said rim and a rod connected with said latch and extending through the rim of the larger segment, whereby upon engagement with the road said rod is actuated to release said latch.

6. A rotary jack and auxiliary wheel for vehicle wheels or the like, said auxiliary wheel being composed of two segments of unequal sizes, each of said segments being composed of segmental rims and a bar connecting the ends of each of said rims, hinges connecting the bars of each segment permitting the smaller segment to swing laterally relative to said larger segment, a spring yieldingly holding said smaller segment in circular operative relation to said larger segment in which position the bars of each segment are arranged face to face, and means for locking said smaller segment in operative relation to said larger segment comprising a latch carried by said larger segment and engaging the bar of said smaller segment, and spring means holding said latch in engagement with said bar, said latch being manually releasable from said bar.

In testimony whereof I hereby affix my signature.

HARRY E. NEHIN.